J. P. WRIGHT.
RAILWAY TRACK INSULATION.
APPLICATION FILED DEC. 12, 1919.
1,333,526.
Patented Mar. 9, 1920.
2 SHEETS—SHEET 1.
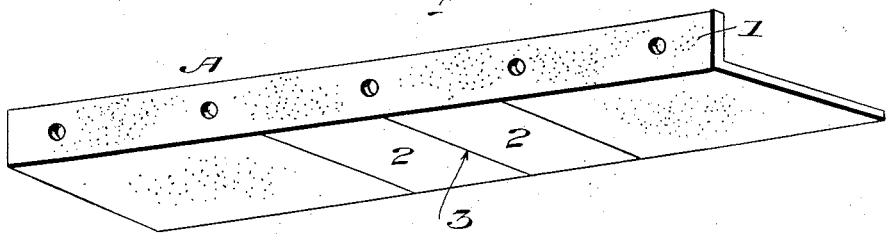
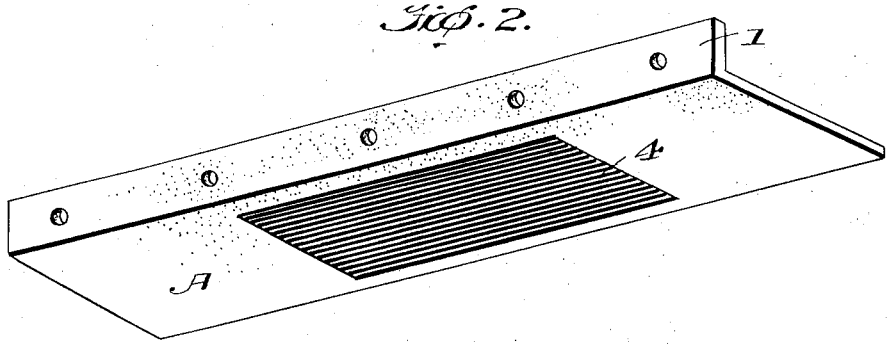
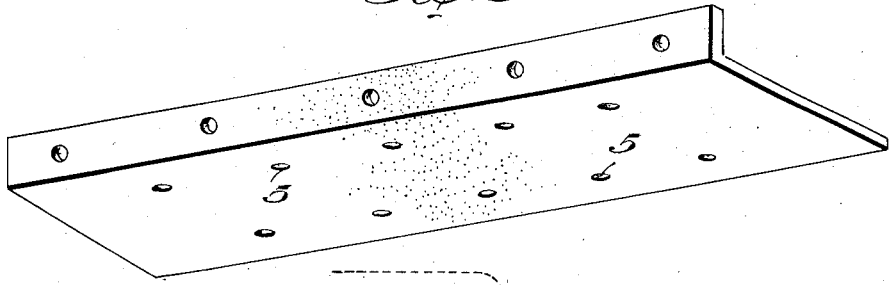
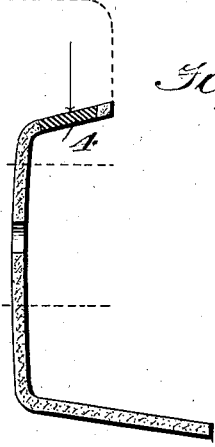

J. P. WRIGHT.
RAILWAY TRACK INSULATION.
APPLICATION FILED DEC. 12, 1919.

1,333,526.

Patented Mar. 9, 1920.
2 SHEETS—SHEET 2.

Witness

Inventor
John P. Wright
By
E. E. Brandenburg
his Attorney

UNITED STATES PATENT OFFICE.

JOHN P. WRIGHT, OF NEWARK, DELAWARE.

RAILWAY-TRACK INSULATION.

1,333,526.  Specification of Letters Patent.  Patented Mar. 9, 1920.

Application filed December 12, 1919. Serial No. 344,418.

*To all whom it may concern:*

Be it known that I, JOHN P. WRIGHT, a citizen of the United States, residing at Newark, in the county of New Castle and State of Delaware, have invented certain new and useful Improvements in Railway-Track Insulations, of which the following is a specification.

My invention relates to an improvement in railway track insulation.

The only objection to bakelized fabric as a material for rail joint insulation, especially for certain kinds of insulated joints, such for instance as the Weber joint in which the required amount of insulation is very large, is the extremely high cost of the bakelized fabric, since a large amount of the latter is required in a joint of that description.

In the Weber joint, which is one of the most common base supported types used, the actual point where the wear takes place is just where the two rail ends meet, the wear of the insulation being occasioned by the end of the rail taking the load, having a tendency to gouge into the insulation material, which is of necessity interposed between the base of the rail and the metal support underneath. In ordinary joints, or in fact in some of the other patented joints, the wear comes at the point where the two rails meet, rather than throughout the entire insulation, whether it be a rail-joint having a base support or some other form of joint.

The object of my present invention is to produce an insulating plate made of two materials, with the idea of substituting a harder and better grade of material at the point or points of wear. In other words, it is the purpose of the present invention to make the major portion of the insulating plate of a softer and relatively cheaper material, with a hard insulating material having very much greater resistance to wear in the form of an insert at the point or points of wear, and this may comprise one or a number of inserts accordingly as required.

In the accompanying drawings:—

Figure 1 is a view in perspective showing an insulating plate of a Weber insulated joint;

Fig. 2 is a similar view showing an insert at the wear point;

Fig. 3 is a view showing a modified form;

Fig. 4 shows another type of rail insulation, the dotted horizontal lines indicating where these plates are sometimes divided, they sometimes being cut at the upper dotted lines and sometimes at the lower dotted lines;

Figure 5:
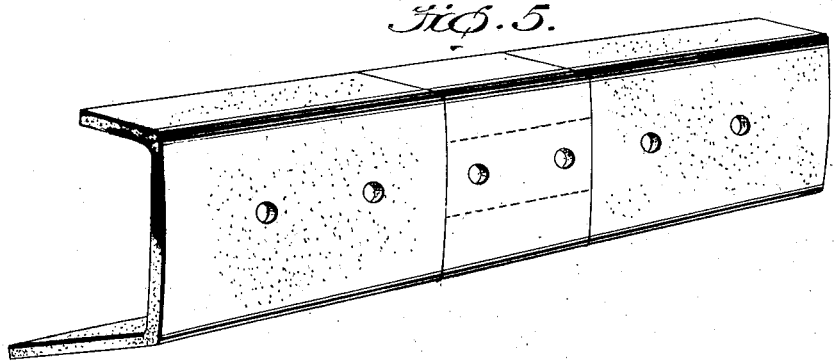
Fig. 5 is a view in perspective of the same.

The portion 1 of the plate marked A, Fig. 1, is not subjected to any wear at all, the purpose of that portion of the plate being simply to hold it in place, which is done by the same bolts that hold the rail ends together, passing through the insulation, the web of the rail usually being filled up with a wooden piece so as to make the joint perfectly rectangular inside.

The point of this plate which is subjected to the greatest wear is the area 2 on each side of the line 3. The fiber becomes cut or gouged out here very quickly, especially in wet weather, and the insulation has to be renewed. Bakelized fabric for a plate of this size is practically prohibitive on account of its high cost.

It is the purpose of this invention to provide insulating plates for this or any other joint with a base support, or in fact any form of rail joint in which the wear on the insulation comes on the insulation itself either between the base of the rail and the support, or in any other place, as the case may be, by manufacturing an insulating plate of vulcanized fiber or any other material which is available and satisfactory for this purpose. Vulcanized fiber is mentioned because it is the cheapest material having other desirable qualities, and it is also universally used to-day for such insulation.

It is my purpose to overcome the defects of manufacturing this insulation plate out of fiber or any other similar material by using an insert in the fiber or similar plate at the point of greatest wear, namely where the rail ends meet. This block or insert 4 (see Fig. 2) is preferably made of bakelized fabric or any other hard suitable material for this purpose. It will be seen that the point of merit would be in this construction, that is that the cost would not be greatly increased over ordinary fiber or other material, but the wear would be made equal to that of a plate made entirely of bakelized fabric.

In making the insert, it would generally be the purpose to punch out a section of the fiber, (this might be rectangular, oval, elliptical, circular, or any other form) and to insert in this hole, a block 4 of the same size but made of bakelized fabric or other similar material to take the wear. This would hardly increase appreciably the cost of the insulation plate, but it would give the same length of life as if the plate were entirely made of bakelized fabric.

Obviously I do not limit myself to bakelized fabric, but I refer to any hard insulating material that is suitable for the purpose. Furthermore, I do not limit the plate to be made out of vulcanized fiber, but it may be of vulcanized fiber or any similar material; nor do I limit myself to the size or shape of the bakelized fabric or other hard insulating insert, because obviously the size and shape might be changed, and it might be made irregular for certain reasons, or it might be made in a variety of forms. Furthermore, I would not care to limit myself to any particular method of fastening this insert in, as it would probably be fastened in any simple mechanical manner, or it might not be fastened at all, as the construction of the joint would lend itself to the use of a plate with a hard insert such as this without much danger of the insert coming out, even if it were not fastened to the fiber.

The dominant feature of the invention, therefore, is the use of a soft and relatively cheaper material for the major portion of the insulating plate, with a hard insulating material of very much greater resistance to wear in the form of an insert at the point of wear. This may be in a single block as shown in Fig. 2, or there might be a plurality of inserts 5, as shown in Fig. 3. These may simply consist of round blocks distributed throughout the base of the plate, or a large insert might be used at the point of wear, and these smaller inserts could be used throughout the base of the plate, the idea being to produce an insulating plate made of two materials with the idea of substituting a harder material at the point or points of wear.

In the construction shown in Fig. 4, there is illustrated a fiber insulation plate for ordinary rail joints or in fact some patented joints using plates of this kind, that is, one on each side of the rail. In this case the wear comes at the point indicated by the arrow, namely at the top, and naturally at the point where two rails meet. In Fig. 5 a plate is shown indicating the point of wear approximately at the center, and Fig. 6 illustrates the insert 4 in one piece at the point of wear at the top.

Figure 6:
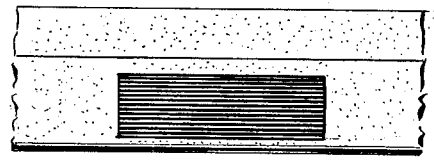
Fig. 6 is a plan view.

In the particular plate shown in Figs. 4 and 5, where the wear is on the top of the plate underneath the head of the rail, the insert 4 could be placed as shown in Fig. 6, which is a plan view of this plate, and the inserts would be of bakelized fiber or any other similar hard wearing material. While this is shown in the form of a rectangle, it obviously could be round or of any other form, and furthermore it might either be fastened in place or just driven in and held frictionally, and it would not necessarily be an insert in the true sense of the word, as I might not punch out a rectangular or round or other form section but might, as a matter of fact, introduce an entire section providing it with bolt-holes to register with the other holes in the plate as shown in Fig. 5, so that the same bolts that hold the main plate in place would also hold this insulating section of superior material, or this superior portion might be divided in sections, as shown by the dotted lines in Fig. 5.

It might also be mentioned at times the insulating plate is divided, as indicated where the horizontal dotted lines are shown in Fig. 4 since these plates are sometimes cut off at the top line, and sometimes at the lower line. Sometimes the head-piece, so-called, comes down so far that the bolt-holes pass through it to hold it in the joint. In short the insulation might be made in various forms, it consisting of two materials as hitherto pointed out, one of superior quality to take the wear.

It will be readily understood that these inserts or insets of bakelized fiber or similar material may be, and generally are, removable as well as renewable, so that when one becomes worn or damaged it may be easily replaced.

Figure 7:
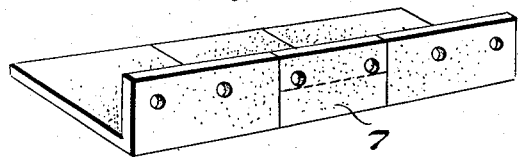
Fig. 7 is a perspective view of an insulation in which the ends are made of one material, and the center (where the greatest wear is) is of another material.

In the construction shown in Fig. 7, I have illustrated a form of insulation in which a whole central section 7 is inserted. This may be made of harder or superior material, or in fact the same material at the point of wear, provision being made so that it may be replaced when worn.

Figure 8:
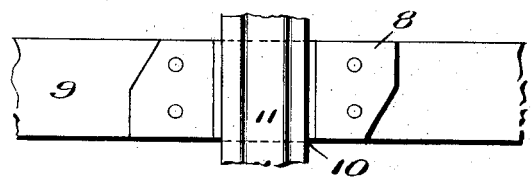
Fig. 8 is a plan view.
Figure 9:
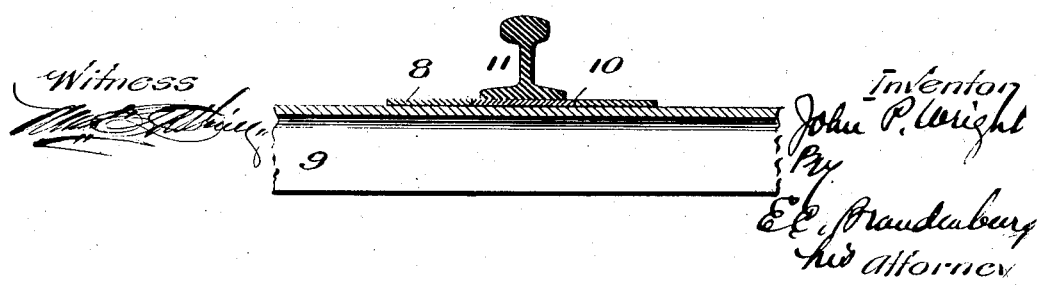
Fig. 9 is a section showing the shim that is used with metal ties, with an insert or inset of superior material.

In Figs. 8 and 9, a rim 8 of insulating material is used where a metal tie 9 is used, and an insert or inset 10 of harder, superior, or replaceable material is used immediately beneath the rail 11.

In conclusion it may be said that in all the places where an insert is employed, where the wear is greatest as pointed out, while my preference is to make the insert of a harder and superior material, obviously this might be made of the same material, so long as it is removable and replaceable when worn, the idea being to employ an insulation in which a worn part may be renewed without the necessity of removing the entire insulation, the insert preferably being of a harder and superior material which will better withstand the wear and punishment at that particular point.

I claim:

1. A rail insulation made of at least two parts, one part in the form of an insert or inserts at the point or points of greatest wear.

2. A rail insulation made of fiber and having a renewable portion where the wear is excessive.

3. A rail insulation having an insert of harder material to take the wear.

4. A rail insulation having a section formed of harder material than the major portion, where the wear is excessive.

5. A rail insulation made of two materials of different degrees of hardness, the harder portion being located at the point or points of greatest wear.

In testimony whereof, I affix my signature.

JOHN P. WRIGHT.